United States Patent
Devkar et al.

(10) Patent No.: US 9,989,376 B2
(45) Date of Patent: Jun. 5, 2018

(54) SYSTEMS AND METHODS FOR GENERATING SIGNATURE AMBIENT SOUNDS AND MAPS THEREOF

(71) Applicant: Tata Consultancy Services Limited, Mumbai (IN)

(72) Inventors: Sujit Devkar, Thane (IN); Sylvan Lobo, Thane (IN); Pankaj Harish Doke, Thane (IN); Sanjay Madhukar Kimbahune, Thane (IN); Mridul Basumotari, Thane (IN); Sachin Sarawgi, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 2 days.

(21) Appl. No.: 15/271,967

(22) Filed: Sep. 21, 2016

(65) Prior Publication Data
US 2017/0328734 A1  Nov. 16, 2017

(30) Foreign Application Priority Data
May 12, 2016 (IN) .............................. 201621016627

(51) Int. Cl.
*G01C 21/36* (2006.01)
*G10L 25/51* (2013.01)
(Continued)

(52) U.S. Cl.
CPC ..... *G01C 21/3697* (2013.01); *G01C 21/3407* (2013.01); *G01C 21/3676* (2013.01);
(Continued)

(58) Field of Classification Search
CPC combination set(s) only.
See application file for complete search history.

(56) References Cited

U.S. PATENT DOCUMENTS

| 6,259,990 B1 | 7/2001 | Shojima et al. |
| 7,496,445 B2 | 2/2009 | Mohsini et al. |

(Continued)

FOREIGN PATENT DOCUMENTS

WO   WO 2010/058062 A1   5/2010

OTHER PUBLICATIONS

Bansode, M. et al., "Voice Recognition and Voice Navigation for Bling using GPS", IJIREEICE, vol. 3, Issue 4, Apr. 2015.

*Primary Examiner* — Adam D Tissot
*Assistant Examiner* — Edward J Pipala
(74) *Attorney, Agent, or Firm* — Finnegan, Henderson, Farabow, Garrett & Dunner LLP

(57) ABSTRACT

Systems and methods are provided for generating signature ambient sounds and maps thereof to assist in navigation based on a start location, a destination location, start time and average walking speed. The maps are generated by concatenating two or more of the signature ambient sounds and two or more of voice based navigation guidance. The signature ambient sounds for up to all location coordinate pairs in a map, for up to all time ranges and for up to all walking speed ranges are generated and tagged to the corresponding location coordinate pair, the corresponding time range and the corresponding average walking speed. The signature ambient sounds are generated by applying digital signal processing techniques on ambient sounds recorded by client devices, that are filtered and outlier removed.

20 Claims, 4 Drawing Sheets

(51) Int. Cl.
*G01C 21/34* (2006.01)
*G06F 17/30* (2006.01)
*G10L 25/15* (2013.01)

(52) U.S. Cl.
CPC .. *G06F 17/30241* (2013.01); *G06F 17/30979* (2013.01); *G10L 25/51* (2013.01); *G10L 25/15* (2013.01)

(56) References Cited

U.S. PATENT DOCUMENTS

| | | | |
|---|---|---|---|
| 8,938,355 B2* | 1/2015 | Das | G01C 21/3602 |
| | | | 701/408 |
| 9,087,455 B2 | 7/2015 | Sai et al. | |
| 9,370,720 B1* | 6/2016 | Milligan | A63F 13/54 |
| 9,602,589 B1* | 3/2017 | Jackson | H04L 67/10 |
| 2011/0177845 A1 | 7/2011 | Fasold | |
| 2013/0163382 A1* | 6/2013 | Millar | G01S 13/46 |
| | | | 367/127 |
| 2015/0112691 A1* | 4/2015 | LeBeau | G10L 15/265 |
| | | | 704/275 |
| 2015/0137998 A1* | 5/2015 | Marti | B60Q 9/00 |
| | | | 340/901 |

\* cited by examiner

… … … … … … … … … … … …

SYSTEMS AND METHODS FOR GENERATING SIGNATURE AMBIENT SOUNDS AND MAPS THEREOF

PRIORITY CLAIM

This U.S. patent application claims priority under 35 U.S.C. § 119 to: India Application No. 201621016627, filed on May 12, 2016. The entire contents of the aforementioned application are incorporated herein by reference.

TECHNICAL FIELD

The embodiments herein generally relate to automated generation of maps, and, more particularly, to systems and methods for generating signature ambient sounds and maps thereof.

BACKGROUND

Maps are visual abstraction of physical space and have been used for navigation for a long time. With advent of internet and mobile devices, the ease of accessibility to maps and hence use of maps has increased manifold. As with conventional maps, the online accessible maps also provide directions for navigation.

Maps are improving constantly and the improvements have largely been in the visual aspect and to some extent on the accessibility aspect as well. Systems for Voice based navigation like Google Maps™ have also been in use. Conventional maps, in both online and paper modes, very well serve the needs of conventional users.

A visually able person would compare the surroundings with the details in the map and hence successfully navigate.

For differently abled users, especially visually-impaired users, it has been a challenge to navigate by interpreting the current maps, as he or she will not be able to easily associate the map with the surrounding environment. Hence with the current technology of providing maps online and through mobile devices, such challenges in terms of accessibility of the information for navigation continue to exist.

Existing systems and methods have made attempts for overcoming these issues by using text to speech functionality to read out the details on the map and also by giving voice based guidance. However these existing systems and methods provide limited gains for users.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below. In view of the foregoing, an embodiment herein provides a system and method for generating signature ambient sounds and maps thereof.

In one embodiment, a processor implemented method is provided. The method comprising: obtaining from one or more client devices, associated information comprising: one or more client device identifiers, one or more users, one or more current time, current date, one or more walking speeds, and one or more location coordinates; generating based on the obtained information, one or more user profiles, one or more user location patterns and one or more average walking speed; querying a database to determine one or more candidate ambient sounds for one or more location coordinate pairs, one or more time ranges and one or more average walking speed ranges based on non-availability of signatures ambient sounds for the corresponding location coordinate pair, the corresponding time range and the corresponding average walking speed range; identifying at least a sub-set of the client devices from the one or more client devices, for recording the one or more candidate ambient sounds based on one or more cluster analysis techniques; activating at least one recording application to record one or more ambient sounds in the sub-set of the client devices; obtaining one or more recorded ambient sounds from the one or more client devices; tagging each of the one or more recorded ambient sounds with the corresponding location coordinate pair, the corresponding time range, the corresponding date and the corresponding average walking speed range; filtering the one or more recorded ambient sounds to obtain one or more filtered ambient sounds; removing outliers from the one or more filtered ambient sounds to obtain one or more outlier filtered ambient sounds; and generating one or more signature ambient sounds based on the one or more outlier filtered ambient sounds.

In an embodiment, filtering the one or more recorded ambient sounds to obtain one or more filtered ambient sounds comprises: validation of quality by filtering of the one or more recorded ambient sounds based on comparison of the one or more recorded ambient sounds with one or more pre-recorded ambient sounds using acoustic fingerprinting techniques.

In another embodiment, the method further comprises: obtaining information pertaining to a start time, a start location and a destination location from a client device associated with a user; determining one or more paths between the start location and the destination location; processing a selection of at least one path from the one or more paths; generating, for the selected path, one or more maps by concatenating at least a subset of two or more of the signature ambient sounds for the location coordinate pairs of the selected path, for the start time, and for an average walking speed of the user, and two or more voice based navigation guidance for the location coordinates of the selected path; and presenting the one or more concatenated maps on the client device.

In an embodiment, when information comprises one or more real time ambient sounds, the method comprises: identifying the start location by comparing the one or more real time ambient sounds with the one or more signature ambient sounds.

In an embodiment, determining the start location comprises: receiving one or more pre-stored ambient sounds of the start location from the client device and comparing the one or more pre-stored ambient sounds with the one or more signature ambient sounds.

In another embodiment, determining the destination location comprises: receiving one or more pre-stored ambient sounds of the destination location from the client device and comparing the one or more pre-stored ambient sounds with the one or more signature ambient sounds.

In an embodiment, determining the one or more paths between the start location and the destination location for the start time comprising at least one of: (i) determining one or more paths taken by other users, and (ii) determining from one or more user location patterns.

In another embodiment, a system is provided. The system comprising: a memory storing instructions; one or more communication interfaces; one or more hardware processors coupled to the memory through the one or more communication interfaces, wherein the one or more hardware processors are configured to execute: a user profile module that is configured to obtain, from one or more client devices, associated information comprising: one or more client device identifiers, one or more users, one or more current time, current date, one or more walking speeds, and one or more location coordinates, and generate based on the obtained information, one or more user profiles, one or more user location patterns and one or more average walking speed; a candidate ambient sound determination module that is configured to query a database to determine one or more candidate ambient sounds for one or more location coordinate pairs, one or more time ranges and one or more average walking speed ranges based on non-availability of signatures ambient sounds for the corresponding location coordinate pair, the corresponding time range and the corresponding average walking speed range and; a client device identification module that is configured to identify, at least a sub-set of the client devices from the one or more client devices, for recording the one or more candidate ambient sounds based on one or more cluster analysis techniques; a recording activation module that is configured to activate at least one recording application to record one or more ambient sounds in the sub-set of the client devices, obtain one or more recorded ambient sounds from the one or more client devices, tag each of the one or more recorded ambient sounds with the corresponding location coordinate pair, the corresponding time range, the corresponding date and the corresponding average walking speed range; a filtration and outlier removal module that is configured to filter the one or more recorded ambient sounds to obtain one or more filtered ambient sounds, remove outliers from the one or more filtered ambient sounds to obtain one or more outlier filtered ambient sounds; and a signature generation module that is configured to generate one or more signature ambient sounds based on the one or more outlier filtered ambient sounds.

In an embodiment, the filtration and outlier removal module filters the one or more recorded ambient sounds to obtain one or more filtered ambient sounds based on validation of quality by filtering of the one or more recorded ambient sounds by performing a comparison of the one or more recorded ambient sounds with one or more pre-recorded ambient sounds using acoustic fingerprinting techniques.

In another embodiment, the system further comprises: a user travel details module that is configured to obtain information pertaining to a start time, a start location and a destination location from a client device associated with a user; a user path determination module that is configured to determine one or more paths between the start location and the destination location, and processes a selection of at least one path from the one or more paths; a maps generation module that is configured to generate, for the selected path, one or more maps by concatenating (i) at least a subset of two or more of the signature ambient sounds for the location coordinate pairs of the selected path, for the start time, and for an average walking speed of the user, and (ii) two or more voice based navigation guidance for the location coordinates of the selected path; and presents the one or more concatenated maps on the client device.

In an embodiment, when information comprises one or more real time ambient sounds, the user travel details module is configured to identify the start location by comparing the one or more real time ambient sounds with the one or more signature ambient sounds. In an embodiment, the user travel details module is configured to determine the start location by receiving one or more pre-stored ambient sounds of the start location from the client device and comparing the one or more pre-stored ambient sounds with the one or more signature ambient sounds.

In another embodiment, the user travel details module determines the destination location by receiving one or more pre-stored ambient sounds of the destination location from the client device and comparing the one or more pre-stored ambient sounds with the one or more signature ambient sounds.

In an embodiment, the user path determination module is configured to determine the one or more paths between the start location and the destination location for the start time comprises at least one of: (i) determining one or more paths taken by other users (ii) determining from one or more user location patterns.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION

Figure 1:
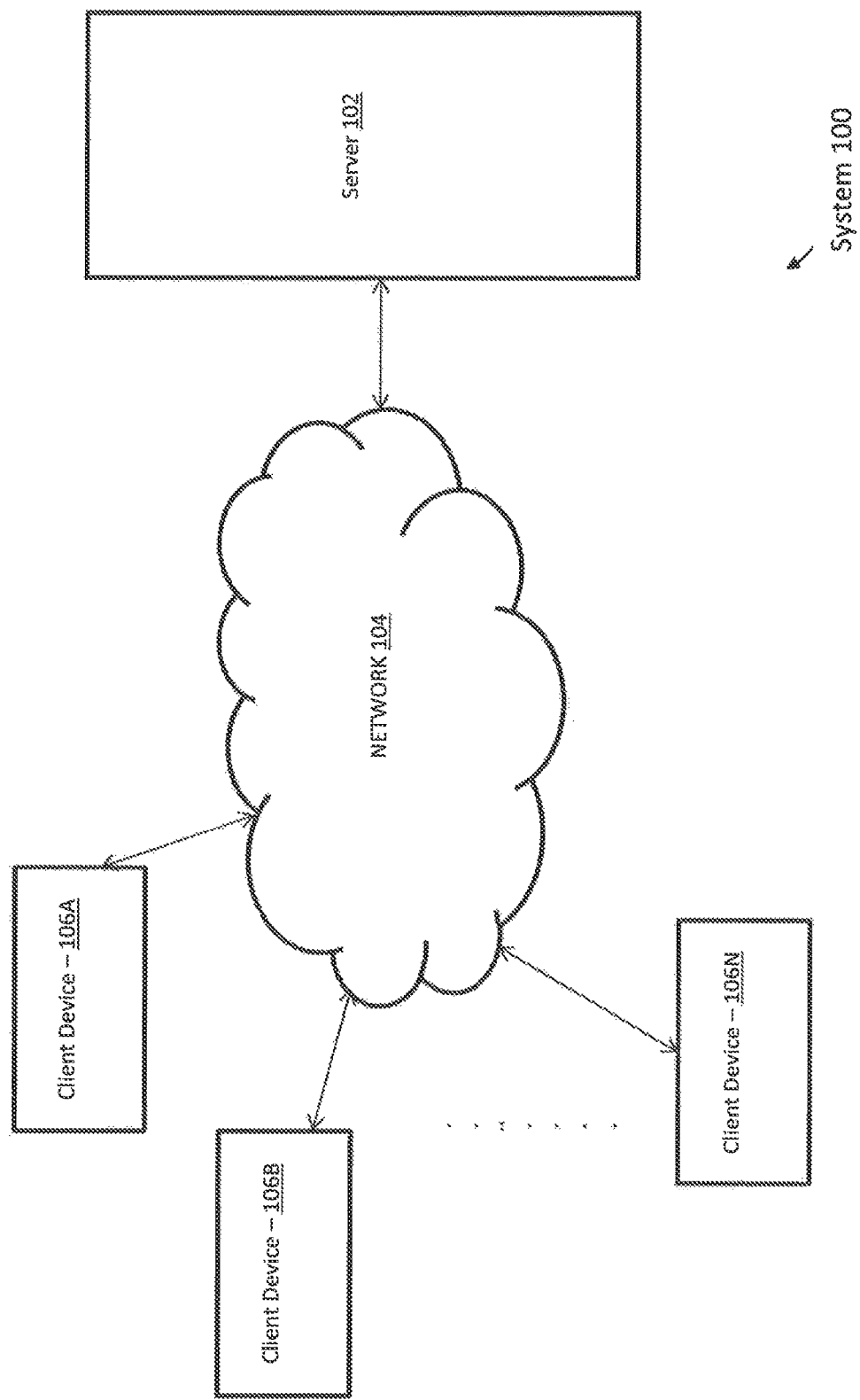
FIG. 1 is a block diagram illustrating a client-server system for according to an embodiment of the present disclosure.

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context clearly dictates otherwise. Although any systems and methods similar or equivalent to those described herein can be used in the practice or testing of embodiments of the present invention, the preferred, systems and methods are now described.

The disclosed embodiments are merely exemplary of the invention, which may be embodied in various forms.

The elements illustrated in the Figures inter-operate as explained in more detail below. Before setting forth the detailed explanation, however, it is noted that all of the discussion below, regardless of the particular implementation being described, is exemplary in nature, rather than limiting. For example, although selected aspects, features, or components of the implementations are depicted as being stored in memories, all or part of the systems and methods consistent with the attrition warning system and method may be stored on, distributed across, or read from other machine-readable media.

The techniques described above may be implemented in one or more computer programs executing on (or executable by) a programmable computer including any combination of any number of the following: a processor, a storage medium readable and/or writable by the processor (including, for example, volatile and non-volatile memory and/or storage elements), plurality of input units, and plurality of output devices. Program code may be applied to input entered using any of the plurality of input units to perform the functions described and to generate an output displayed upon any of the plurality of output devices.

Computer implemented systems and methods for generating signature ambient sounds and maps thereof, will now be described with reference to the embodiments shown in the accompanying drawings.

As used herein, the term "Location Coordinate" refers to the latitude and longitude of a particular location.

As used herein, the term "Location Coordinate Pair" refers to the latitude and longitude of a particular location and the latitude and longitude of the following location as per the least granularity of the map. For example, it could be the latitude and longitude of a particular location and the latitude and longitude of the following location one meter forward in the direction of movement of the user if the least granularity of the map is one meter.

As used herein, the term "Path" refers to a plurality of Location Coordinates between a start location and a destination location.

As used herein, the term "User Profile" refers to the information captured about a user including for example a device identifier, user, current time, current date, walking speed and location coordinates.

As used herein, the term "Average Walking Speed" refers to average of walking speed of a user computed from a plurality of user profiles of the user.

As used herein, the term "Average Walking Speed Range" refers to range in which the average walking speed of the user is categorized. For example, the "Average Walking Speed Range" can have values like 1 to 2 meter per minute, 2 to 3 meter per minute, 3 to 4 meters per minute.

As used herein, the term "Time Range" refers to ranges in which time of the day is categorized. For example, 09:00 hours to 10:00 hours, 10:00 hours to 11:00 hours, 11:00 hours to 12:00 hours.

As used herein, the term "User" refers to a visually impaired user or to a user with no visual impairment or a normal user of the system.

As used herein, the term "Location Pattern" refers to all the paths, consisting of a series of location coordinates, taken by the user or other users.

Referring now to the drawings, and more particularly to FIG. 1 through FIG. 4, where similar reference characters denote corresponding features consistently throughout the figures, there are shown preferred embodiments and these embodiments are described in the context of the following exemplary system and/or method.

FIG. 1 is a block diagram illustrating a client-server system 100, according to an embodiment of the present disclosure. The user of client-server system 100 can be a visually impaired user or a user with no visual impairment or a normal user. The system 100 includes a server 102, a network 104 and one or more client devices for example a client device 106A, a client device 106B and so on to a client device 106N, hereinafter collectively referred to as 'client device 106'. The server 102 is communicably coupled to the client device 106 through the network 104. The server 102 provides the client device 106 accesses to audio map and voice map and also obtains recorded ambient sounds from the client device 106.

In one implementation, the network 104 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
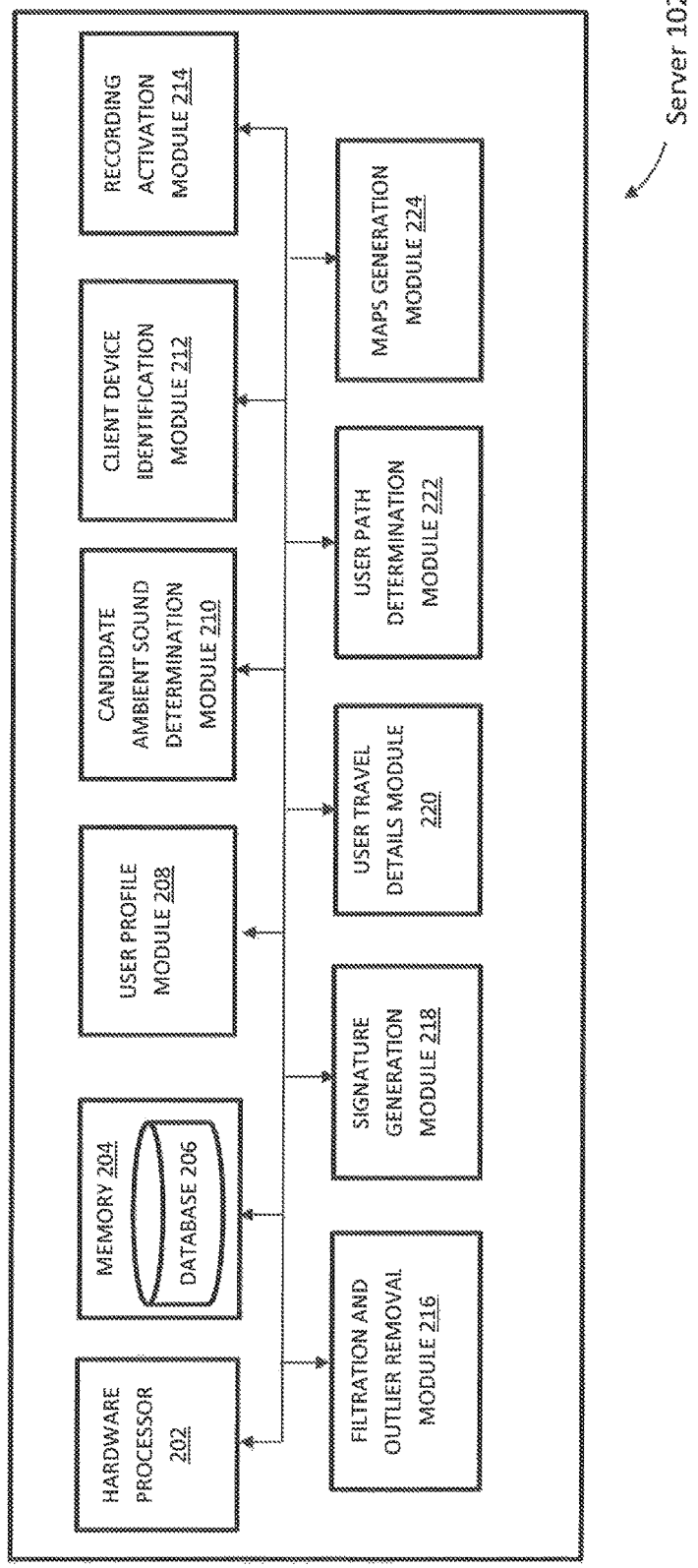
FIG. 2 is a block diagram of a server generating signature ambient sounds and maps according to an embodiment of the present disclosure.

FIG. 2 is a block diagram illustrating the server 102 of FIG. 1 for generating one or more signature ambient sounds and maps according to an embodiment of the present disclosure. The server 102 includes a hardware processor 202, a memory 204 storing instructions and a database 206, a user profile module 208, a candidate ambient sound determination module 210, a client device identification module 212, a recording activation module 214, a filtration and outlier removal module 216, a signature generation module 218, a user travel details module 220, a user path determination module 222, and a maps generation module 224. Although the exemplary block diagram and the associated description refers to a memory and a hardware processor, it may be understood that one or more memory units and one or more hardware processors may be comprised in the system 102. The memory 204 further includes one or more functional modules 208 till 224. The memory 204, the hardware processor 202, the modules, and input/output (I/O) interface (not shown in FIG. 2) may be coupled by a system bus or a similar mechanism.

The memory 204, may store instructions, any number of pieces of information, and data, used by a computer system, for example the system 102 to implement the functions of the system 102. The memory 204 may include for example, volatile memory and/or non-volatile memory. Examples of volatile memory may include, but are not limited to volatile random access memory (RAM). The non-volatile memory may additionally or alternatively comprise an electrically erasable programmable read only memory (EEPROM), flash memory, hard drive, or the like. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 102 may be configured to store information, data, instructions or the like for enabling the system 100 to carry out various functions in accordance with various example embodiments.

Additionally or alternatively, the memory 204 may be configured to store instructions which when executed by the hardware processor 202 causes the system 100 to behave in a manner as described in various embodiments. The memory 204 stores the functional modules and information, for example, information (e.g., user profiles, signature ambient sounds, maps, and so on).

The hardware processor 202 may be implemented as one or more microprocessors, microcomputers, microcontrollers, digital signal processors, central processing units, state machines, logic circuitries, and/or any devices that manipulate signals based on operational instructions. Further, the hardware processor 202 may comprise a multi-core architecture. Among other capabilities, the hardware processor 202 is configured to fetch and execute computer-readable instructions or modules stored in the memory 204. The hardware processor 202 may include circuitry implementing, among others, audio and logic functions associated with the communication. For example, the hardware processor 202 may include, but are not limited to, one or more digital signal processors (DSPs), one or more microprocessor, one or more special-purpose computer chips, one or more field-programmable gate arrays (FPGAs), one or more application-specific integrated circuits (ASICs), one or more computer(s), various analog to digital converters, digital to analog converters, and/or other support circuits.

The hardware processor 202 thus may also include the functionality to encode messages and/or data or information. The hardware processor 202 may include, among others a clock, an arithmetic logic unit (ALU) and logic gates configured to support operation of the hardware processor 202. Further, the hardware processor 202 may include functionality to execute one or more software programs, which may be stored in the memory 204 or otherwise accessible to the hardware processor 202.

The database 206 stores data regarding users, user profiles, signature ambient sounds, corresponding location coordinate pairs, corresponding time ranges, corresponding average walking speed ranges, thresholds and currency of the signature ambient sounds.

In one embodiment the database 206 can store the maps accessed from mapping systems like Google Maps™, Bing Maps™, Apple Maps™ along with corresponding data and voice based guidance.

In another embodiment the maps along with the corresponding data and the voice based guidance is accessed real time from systems like Google Maps™, Bing Maps™, Apple Maps™ and hence not necessarily stored in the database 206.

The maps accessed from mapping systems divide the map into a grid system. The resolution of the grid could be for example one meter.

The server 102, identifies ambient sounds to record, identifies sub-set of the client devices 106 to activate recording of the ambient sounds, obtains the ambient sounds recorded on the client devices 106, filters recorded ambient sounds, removes outliers from filtered ambient sounds and generates signature ambient sounds by applying digital signal processing techniques on outlier filtered ambient sounds. The signature ambient sounds are tagged to the corresponding location coordinate pairs, the corresponding time ranges and the corresponding average walking speed ranges.

To assist the user in navigating from a start location to a destination location, the server 102, generates audio map and voice map for a selected path and presents on the client device 106.

The voice map comprises of concatenation of two or more of the voice based navigation guidance.

The audio map comprises of concatenation of two or more of the signature ambient sounds for each of the location coordinate pairs in the path, for the time range of start time and the average walking speed range of the user's average walking speed.

To be able to provide the audio map, the database 206 needs to have the signature ambient sounds for up to all the location coordinate pairs in the map, for up to all the time ranges and for up to all the average walking speed ranges.

To obtain the signature ambient sounds, the server 102 determines (i) candidate ambient sounds for which the signature ambient sounds that are required and (ii) the client devices 106 that need to be used to record the ambient sounds.

Figure 3:
FIG. 3 is a flow diagram illustrating a method for generating one or more signature ambient sounds using the server of FIG. 2 according to an embodiment of the present disclosure.

FIG. 3, with reference to FIGS. 1-2, is a flow diagram illustrating a method generating one or more signature ambient sounds using the server of FIG. 2 according to an embodiment of the present disclosure. The steps of the method of FIG. 3 of the present disclosure will now be explained with reference to the components of the system 100 as depicted in FIG. 1. The server 102 is configured by the instructions stored in the memory 204. The server 102 (or the hardware processor 202) when configured by the instructions automatically generates one or more signature ambient sounds as described hereinafter. At 302, the user profile module 208, obtains information through the client devices 106. In an embodiment, the information may be obtained at a pre-determined frequency (or pre-defined intervals) and may comprise one or more client device identifiers, the one or more users, one or more current time, current date, the one or more walking speeds and the one or more location coordinates.

At step 304, the user profile module 208 generates user profiles from the obtained information, generates average walking speed of the user based on the walking speeds of the user obtained (or derived) from plurality of the user profiles. In the same step 304, the user profile module 208 generates location patterns based on the plurality of location coordinates traversed by the user. At step 306, the candidate ambient sound determination module 210 determines one or more candidate ambient sounds to record the ambient sounds by querying the database 206 for non-availability of corresponding signatures ambient sounds. In an embodiment, the candidate ambient sound determination module 210 determines one or more candidate ambient sounds for the one or more location coordinate pairs, the one or more time ranges and the one or more average walking speed ranges based on non-availability of corresponding signatures ambient sounds for the corresponding location coordinate pair, the corresponding time range and the corresponding average walking speed range.

At step 308, based on one or more the user profiles and the candidate ambient sounds, the client device identification module 212 identifies at least a sub-set of the client devices to record one or more ambient sounds for the one or more location coordinate pairs, for the one or more time ranges and for the one or more the average walking speed ranges, while the user walks between the location coordinates. In one embodiment, the client device identification module 212 identifies the sub-set of client devices using one or more cluster analysis techniques. There may be instances where the client device identification module 212 may identify all the client devices 106A-N for recording ambient sounds.

At step 310, the recording activation module 214 activates the identified client devices for initiation of recording of the ambient sounds by means of at least one recording application activated on the client device 106. In an embodiment, the activation of recording application may be automatically performed by the server 102, or a notification message may be transmitted to the client devices. Corresponding client devices users may activate recording application on the client device and the ambient sounds pertaining to respective location coordinate pairs may be recorded. The recorded ambient sounds are then obtained by the recording activation module 214. In an embodiment, the recording activation module 214 may activate recording for the one or more candidate ambient sounds till count of the outlier filtered ambient sounds for the location coordinate pairs, for the time range and for the average walking speed range, reaches a pre-defined threshold. For example, the server 102 may set a threshold such as number of ambient sounds to be recorded pertaining to one or more location coordinate pairs. In an example embodiment, the threshold may be set for each client device. In other words, the server 102 may set threshold for each client device and may vary across each of the client devices. When the threshold is reached, the recording activation module 214 may automatically deactivate the recording application in the corresponding client devices 106 or may transmit a notification message to the respective client devices requesting to turn off the recording application. Based on the notification message, one or more actions may be performed by the users associated with the client devices. In an example embodiment, the one or more actions may comprise, turning off the recording application, and terminating the recording feature, and transmitting recorded ambient sound(s) to the server 102 for further processing. In an embodiment, the recording application at the client devices 106 may be configured such that it may automatically determine the time for recording based on time range for recording received from the server 102, and perform specific actions accordingly (e.g., recording ambient sounds, and transmitting the recorded ambient sounds to the server 102), thus preventing any human intervention.

In one embodiment, the recording activation module 214 determines the time range from time of recording of the ambient sound, determines the average walking speed range from the average walking speed of corresponding users of the client device 106 and determines the location coordinate pair from the location coordinates of the client device 106. At step 314, the recording activation module 214 is configured to tag the recorded ambient sounds with the corresponding location coordinate pairs, the corresponding time range, the date and the corresponding average walking speed range. At step 316, the filtration and outlier removal module 216 is configured to validate quality of the tagged ambient sounds by filtering the one or more recorded ambient sounds based on at least one (i) comparison of the recorded ambient sounds with one or more pre-recorded ambient sounds using acoustic fingerprinting techniques; (ii) rating of the recorded ambient sounds by the user by comparing the recorded ambient sounds with actual ambient sounds at the location; and/or (iii) rating of the recorded ambient sounds by one or more other user(s).

In one embodiment, the filtration and outlier removal module 216 discards the recorded ambient sounds with rating below a pre-determined rating threshold. In an embodiment, the recorded ambient sounds may be made available to one or more users for rating. Based on the ratings, select recorded ambient sounds may be discarded that are not meeting the criteria. For examples, rating may be provided out of 10. If 5 is a pre-determined rating threshold (configured in the server 102), rating give below 5 to any recorded ambient sounds may be discarded. Likewise, any recorded ambient sounds that have rating equal to or above the pre-determined rating threshold may be considered/selected for further processing.

At step 318, the filtration and outlier removal module 216 removes outliers from the one or more filtered ambient sounds (e.g., filtered ambient sounds that meet the criteria) based on one or more noise reduction techniques to obtain the one or more outlier filtered ambient sounds.

At step 320, the signature generation module 218 is configured to generate one or more signature ambient sounds based on the one or more outlier filtered ambient sounds. In an embodiment, the signature generation module 218 generates the one or more signature ambient sounds by applying one or more digital signal processing techniques on the one or more outlier filtered ambient sounds.

In one embodiment, the signature generation module 218 is configured to generate one or more signature ambient sounds based on the count of outlier filtered ambient sounds reaching a pre-determined threshold.

In one example embodiment, the one or more signature ambient sounds are valid for a pre-determined period for example a count of days or a count of months. After the per-determined period, the one or more signature ambient sound may be no longer valid and hence new signature ambient sounds may be recorded again for the same location coordinate pairs. Lifetime of the one or more signature ambient sounds may be dependent upon one or more objects being present at corresponding location coordinate pairs. In other words, lifetime of the one or more signature ambient sounds may be dependent upon one or more objects that transmit (or continue to transmit) ambient sounds at the corresponding location coordinate pairs so that users while navigating a selected path can realize the signature ambient sound and correlate with ambient sounds being transmitted in real time during his/her walk in the selected path.

When a user requires to navigate from a start location to a destination location, the audio map enables the user to compare the plurality of signature ambient sounds with actual ambient sounds, and the plurality of navigation guidance in the voice map enables the user in navigating to the destination.

The audio map is generated based on the start location, the destination location, start time and average walking speed of the user. The voice map is generated based on the start location and the destination location of the user. The audio map and the voice map are presented on the client device 106.

Figure 4:
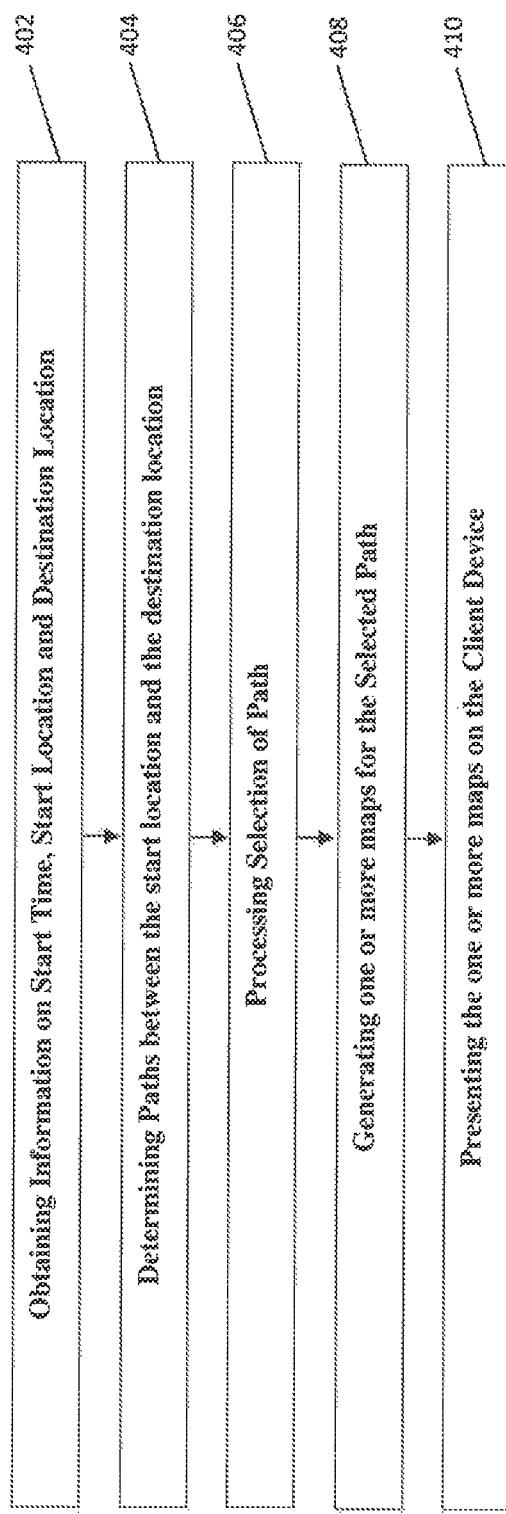
FIG. 4 is a flow diagram illustrating a method for generating one or more maps using the signature ambient sounds generated by the server of FIG. 2 according to an embodiment of the present disclosure.

FIG. 4, with reference to FIGS. 1-3, is flow diagram illustrating a method for generating one or more maps using the signature ambient sounds generated by the server 102 of FIG. 1 according to an embodiment of the present disclosure. The steps of the method of FIG. 4 of the present disclosure will now be explained with reference to the components of the system 100 as depicted in FIG. 1. The server 102 is configured by the instructions stored in the memory 204. The server 102 (or the hardware processor 202) when configured by the instructions automatically generates one or more maps for navigation based on the generated one or more signature ambient sounds as described hereinafter. At step 402, the user travel details module 220 is configured to obtain information from a client device associated with a user. In an embodiment, the information may comprise but are not limited to, (i) a start time, (ii) a start location or one or more real time ambient sounds obtained from the start location and (iii) a destination location or one or more pre-stored ambient sounds for the destination location. In an embodiment, the start time may be provided by the user, or may be obtained through a voice command. The user travel details module 220 determines information pertaining to current location as the start location by: (i) obtaining the location coordinates of the current location from the client device 106; or (ii) identifying the current location by comparing the one or more real time ambient sounds of the current location with the one or more signature ambient sounds stored in the database 206. In an example embodiment, the comparison of the one or more real time ambient sounds of the current location with the one or more signature ambient sounds may be performed using one or more digital signal processing techniques. In another embodiment the user travel details module 220 may determine information pertaining to the start location by: (i) obtaining the location coordinates of the start location from the client device 106 as provided by the user; or (ii) receiving one or more pre-stored ambient sounds of the start location from the client device 106 and comparing the received one or more pre-stored ambient sounds with the one or more signature ambient sounds using digital signal processing techniques; or (iii) voice recognition of voice command through the client device 106 providing the start location. In an embodiment, the user travel details module 220 can determine information pertaining to the destination location by: (i) obtaining the location coordinates of the destination location from the client device 106 as provided by the user; or (ii) receiving one or more pre-stored ambient sounds of the destination location from the client device 106 and comparing the received one or more pre-stored ambient sounds with the one or more signature ambient sounds through digital signal processing techniques; or (iii) voice recognition of voice command through the client device 106 providing the destination location.

In one embodiment comparing, the real time ambient sounds or the pre-stored ambient sounds, with the one or more signature ambient sounds through digital signal processing techniques can be made more efficient by comparing with a subset of the one or more signature ambient sounds corresponding to the location coordinate pairs based on the user's location patterns.

The user travel details module 220 on identification of plurality of start locations, determines the start location by processing selection of at least one start location from the plurality of start locations.

In another embodiment the user travel details module 220 on identification of plurality of destination locations, determines the destination location by processing selection of at least one destination location from the plurality of destination locations.

At step 404, on determining the start location, the destination location and the start time, the user path determination module 222 is configured to determine (or identify) one or more paths between the start location and the destination location for the start time. In an example embodiment, the one or more paths may be determined based on at least one of (i) one or more paths traveled by other user(s) between the start location and the destination location for the start time, and user location patterns for the start location and the destination location. In an embodiment, the one or more paths may be determined using one or more techniques for example, but are not limited to, time series analysis techniques such as Hidden Markov & Artificial Neural Networks, or routing techniques (e.g., Dijkstra's technique).

The user path determination module 222 then presents the one or more identified paths on the client device 106.

At step 406, the user path determination module 222 processing selection of at least one path from the one or more identified paths. In an example embodiment, the selection of the at least one path from the one or more identified paths may be performed by users requiring navigation guidance. The selection of the at least one path may be through one or more inputs, for example, but are not limited to, using one or more input interfaces such as keyboard, keypad, voice command(s), or gestures on displays, or image capturing techniques, and so on. The users may indicate selection of path either by showing one or more fingers to an image capturing device that accepts these as inputs and converts to numerals, where converted numeral can denote the selected path. For example, a user may show 2 fingers that can be captured by the image capturing device. In such scenarios, path 2 from the identified paths may be selected by the server 102 for further processing.

At step 409, for the selected path, the maps generation module 224 generates one or more maps. The one or more maps comprise but are not limited to, one or more audio and voice maps. In an example embodiment, the one or more maps are generated concatenating at least a subset of two or more signature ambient sounds previously stored in the database 206. The one or more maps are generated for location coordinate pairs of the selected path, for the time range and for the average walking speed range. The one or more maps may further comprise two or more voice based navigation guidance along with at least the subset of two or more signature ambient sounds, for the location coordinates of the selected path. The one or more concatenated maps (e.g., map comprising audio and voice) are then presented on the client device 106 for navigation. In one embodiment, the maps generation module 224 transmits the one or more concatenated maps (audio map and/or the voice map) in one or more formats (e.g., an extensible markup language (xml) format to the client device 106, wherein the client device 106 is capable of converting the xml format in a format that is easily understood and interpreted by the client device 106 for providing user friendly navigation based guidance services. In the absence of one or more signature ambient sounds for one or more location coordinate pairs of the selected path, server 102 may select signature ambient sounds pertaining to location coordinate pairs that are in close proximity the one or more location coordinate pairs in the selected path.

In another embodiment, the maps generation module 224 presents the audio map and the voice map on the client device 106 for the user to experience navigating through the path without actually moving through the path.

In an embodiment, the maps generation module 224 determines the average walking speed range from the average walking speed of the user and determines the time range from the start time.

In one embodiment, the user requiring the audio map and the voice map can be different from a user of a client device recording the ambient sounds.

The user will walk through locations at speed that may vary and also the speed of different users may be different. Hence to be able to share the most suitable audio map, the average walking speed and hence the average walking speed range is important.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of present disclosure herein addresses unresolved problem of guiding users (e.g., normal users, visually impaired users) from a start location to a destination location in a manner such that users are able to compare the provided supporting inputs with the surroundings. The embodiment, thus provides systems and methods for generating signature ambient sounds that are used in map generation for guiding users for navigation through space with the help of maps (e.g., audio maps, comprising of the signature ambient sounds, and voice maps, comprising of voice based guidance, along a path for traveling from the start location to the destination location, based on the time of the day and the average walking speed of the user), thereby enabling users to compare the ambient sounds of the surroundings with the signature ambient sounds presented in map(s).

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), BLU-RAY, and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A processor implemented method, comprising:
   obtaining from one or more client devices, associated information comprising: one or more client device identifiers, one or more users, one or more current time, current date, one or more walking speeds, and one or more location coordinates;
   generating based on the obtained information, one or more user profiles, one or more user location patterns and one or more average walking speeds;
   querying a database to determine one or more candidate ambient sounds for one or more location coordinate pairs, one or more time ranges and one or more average walking speed ranges based on non-availability of signatures ambient sounds for a corresponding location coordinate pair, a corresponding time range and a corresponding average walking speed range;

identifying at least a sub-set of client devices from the one or more client devices, for recording the one or more candidate ambient sounds based on one or more cluster analysis techniques;

activating at least one recording application to record one or more ambient sounds in the sub-set of client devices based on walking speed of corresponding users;

obtaining one or more recorded ambient sounds from the sub-set of client devices;

tagging each of the one or more recorded ambient sounds with the corresponding location coordinate pair, the corresponding time range, the corresponding date and the corresponding average walking speed range;

filtering the one or more tagged ambient sounds to obtain one or more filtered ambient sounds;

removing outliers from the one or more filtered ambient sounds to obtain one or more outlier filtered ambient sounds;

generating one or more signature ambient sounds based on the one or more outlier filtered ambient sounds; and generating one or more maps between a start location and a destination location of a user, including the one or more signature ambient sounds based on start time and an average walking speed of the user.

2. The method according to claim 1, wherein filtering the one or more recorded ambient sounds to obtain one or more filtered ambient sounds comprises:

validation of quality by filtering of the one or more recorded ambient sounds based on comparison of the one or more recorded ambient sounds with one or more pre-recorded ambient sounds using acoustic fingerprinting techniques.

3. The method according to claim 1, wherein generating one or more maps comprises:

obtaining information pertaining to the start time, the start location and the destination location from a client device associated with the user;

determining one or more paths between the start location and the destination location;

processing a selection of at least one path from the one or more paths;

generating, for the selected path, the one or more maps by concatenating at least a subset of two or more of the signature ambient sounds for the location coordinate pairs of the selected path, for the start time, and for the average walking speed of the user, and two or more voice based navigation guidance for the location coordinates of the selected path; and presenting the one or more concatenated maps on the client device.

4. The method according to claim 3, wherein when information comprises one or more real time ambient sounds, said method further comprises:

identifying the start location by comparing the one or more real time ambient sounds with the one or more signature ambient sounds.

5. The method according to claim 3, wherein determining the start location comprises:

receiving one or more pre-stored ambient sounds of the start location from the client device and comparing the one or more pre-stored ambient sounds with the one or more signature ambient sounds.

6. The method according to claim 3, wherein determining the destination location comprises:

receiving one or more pre-stored ambient sounds of the destination location from the client device and comparing the one or more pre-stored ambient sounds with the one or more signature ambient sounds.

7. The method according to claim 3, further comprising:

determining the one or more paths between the start location and the destination location for the start time comprising at least one of: (i) determining one or more paths taken by other users (ii) determining from one or more user location patterns.

8. A system, comprising:

a memory storing instructions;

one or more communication interfaces;

one or more hardware processors coupled to the memory through the one or more communication interfaces, wherein the one or more hardware processors are configured by the instructions to execute:

a user profile module that is configured to obtain, from one or more client devices, associated information comprising: one or more client device identifiers, one or more users, one or more current time, current date, one or more walking speeds, and one or more location coordinates, and generate based on the obtained information, one or more user profiles, one or more user location patterns and one or more average walking speeds;

a candidate ambient sound determination module that is configured to query a database to determine one or more candidate ambient sounds for one or more location coordinate pairs, one or more time ranges and one or more average walking speed ranges based on non-availability of signatures ambient sounds for a corresponding location coordinate pair, a corresponding time range and a corresponding average walking speed range;

a client device identification module that is configured to identify, at least a sub-set of client devices from the one or more client devices, for recording the one or more candidate ambient sounds based on one or more cluster analysis techniques;

a recording activation module that is configured to activate at least one recording application to record one or more ambient sounds in the sub-set of client devices based on walking speed of corresponding users, obtain one or more recorded ambient sounds from the sub-set of client devices, tag each of the one or more recorded ambient sounds with the corresponding location coordinate pair, the corresponding time range, the corresponding date and the corresponding average walking speed range;

a filtration and outlier removal module that is configured to filter the one or more tagged ambient sounds to obtain one or more filtered ambient sounds, remove outliers from the one or more filtered ambient sounds to obtain one or more outlier filtered ambient sounds;

a signature generation module that is configured to generate one or more signature ambient sounds based on the one or more outlier filtered ambient sounds; and a maps generation module that is configured to generate one or more maps, between a start location and a destination location of a user, including the one or more signature ambient sounds based on start time and an average walking speed of the user.

9. The system according to claim 8, wherein the filtration and outlier removal module filters the one or more recorded ambient sounds to obtain one or more filtered ambient sounds based on validation of quality by filtering of the one or more recorded ambient sounds by performing a comparison of the one or more recorded ambient sounds with one or more pre-recorded ambient sounds using acoustic fingerprinting techniques.

10. The system according to claim 8, further comprises:
a user travel details module that is configured to obtain information pertaining to the start time, the start location and the destination location from a client device associated with the user;
a user path determination module that is configured to determine one or more paths between the start location and the destination location, and processes a selection of at least one path from the one or more paths; and
the maps generation module that is configured to generate, for the selected path, the one or more maps by concatenating (i) at least a subset of two or more of the signature ambient sounds for the location coordinate pairs of the selected path, for the start time, and for the average walking speed of the user, and (ii) two or more voice based navigation guidance for the location coordinates of the selected path and to present the one or more concatenated maps on the client device.

11. The system according to claim 10, wherein when information comprises one or more real time ambient sounds, the user travel details module is configured to identify the start location by comparing the one or more real time ambient sounds with the one or more signature ambient sounds.

12. The system according to claim 10, wherein the user travel details module is configured to determine the start location by receiving one or more pre-stored ambient sounds of the start location from the client device and comparing the one or more pre-stored ambient sounds with the one or more signature ambient sounds.

13. The system according to claim 10, wherein the user travel details module determines the destination location by receiving one or more pre-stored ambient sounds of the destination location from the client device and comparing the one or more pre-stored ambient sounds with the one or more signature ambient sounds.

14. The system according to claim 10, wherein the user path determination module is configured to determine the one or more paths between the start location and the destination location for the start time comprises at least one of: (i) determining one or more paths taken by other users (ii) determining from one or more user location patterns.

15. One or more non-transitory machine readable information storage mediums comprising one or more instructions which when executed by one or more hardware processors causes:
obtaining from one or more client devices, associated information comprising: one or more client device identifiers, one or more users, one or more current time, current date, one or more walking speeds, and one or more location coordinates;
generating based on the obtained information, one or more user profiles, one or more user location patterns and one or more average walking speeds;
querying a database to determine one or more candidate ambient sounds for one or more location coordinate pairs, one or more time ranges and one or more average walking speed ranges based on non-availability of signatures ambient sounds for a corresponding location coordinate pair, a corresponding time range and a corresponding average walking speed range;
identifying at least a sub-set of client devices from the one or more client devices, for recording the one or more candidate ambient sounds based on one or more cluster analysis techniques;
activating at least one recording application to record one or more ambient sounds in the sub-set of client devices based on walking speed of corresponding users;
obtaining one or more recorded ambient sounds from the sub-set of client devices;
tagging each of the one or more recorded ambient sounds with the corresponding location coordinate pair, the corresponding time range, the corresponding date and the corresponding average walking speed range;
filtering the one or more tagged ambient sounds to obtain one or more filtered ambient sounds;
removing outliers from the one or more filtered ambient sounds to obtain one or more outlier filtered ambient sounds;
generating one or more signature ambient sounds based on the one or more outlier filtered ambient sounds; and
generating one or more maps, between a start location and a destination location of a user, including the one or more signature ambient sounds based on start time and an average walking speed of the user.

16. The one or more non-transitory machine readable information storage mediums of claim 15, wherein filtering the one or more recorded ambient sounds to obtain one or more filtered ambient sounds comprises:
validation of quality by filtering of the one or more recorded ambient sounds based on comparison of the one or more recorded ambient sounds with one or more pre-recorded ambient sounds using acoustic fingerprinting techniques.

17. The one or more non-transitory machine readable information storage mediums of claim 15, wherein said instructions further cause:
obtaining information pertaining to the start time, the start location and the destination location from a client device associated with the user;
determining one or more paths between the start location and the destination location;
processing a selection of at least one path from the one or more paths;
generating, for the selected path, the one or more maps by concatenating at least a subset of two or more of the signature ambient sounds for the location coordinate pairs of the selected path, for the start time, and for the average walking speed of the user, and two or more voice based navigation guidance for the location coordinates of the selected path; and
presenting the one or more concatenated maps on the client device.

18. The one or more non-transitory machine readable information storage mediums of claim 17, wherein when information comprises one or more real time ambient sounds, said instructions further cause:
identifying the start location by comparing the one or more real time ambient sounds with the one or more signature ambient sounds, and
wherein determining the start location comprises:
receiving one or more pre-stored ambient sounds of the start location from the client device and comparing the one or more pre-stored ambient sounds with the one or more signature ambient sounds.

19. The one or more non-transitory machine readable information storage mediums of claim 17, wherein determining the destination location comprises:

receiving one or more pre-stored ambient sounds of the destination location from the client device and comparing the one or more pre-stored ambient sounds with the one or more signature ambient sounds.

20. The one or more non-transitory machine readable information storage mediums of claim 17, said instructions further cause:

determining the one or more paths between the start location and the destination location for the start time comprising at least one of: (i) determining one or more paths taken by other users (ii) determining from one or more user location patterns.

* * * * *